Feb. 8, 1938.　　　　L. E. ROSE　　　　2,107,649
CHECKROW PLANTER
Filed June 4, 1936　　　5 Sheets-Sheet 1
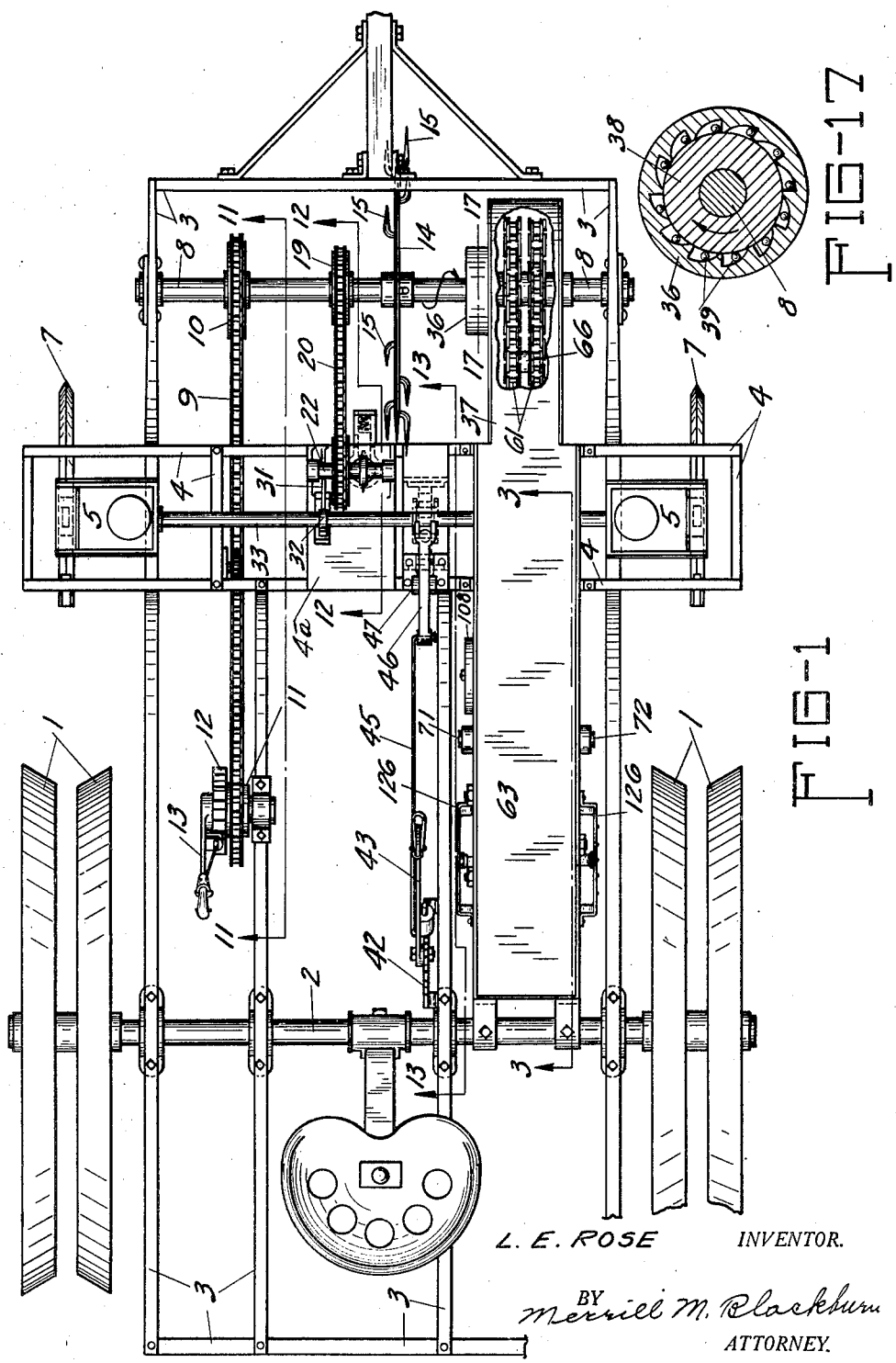
L. E. ROSE　INVENTOR.
BY Merrill M. Blackburn
ATTORNEY.

Feb. 8, 1938. L. E. ROSE 2,107,649
CHECKROW PLANTER
Filed June 4, 1936 5 Sheets-Sheet 2
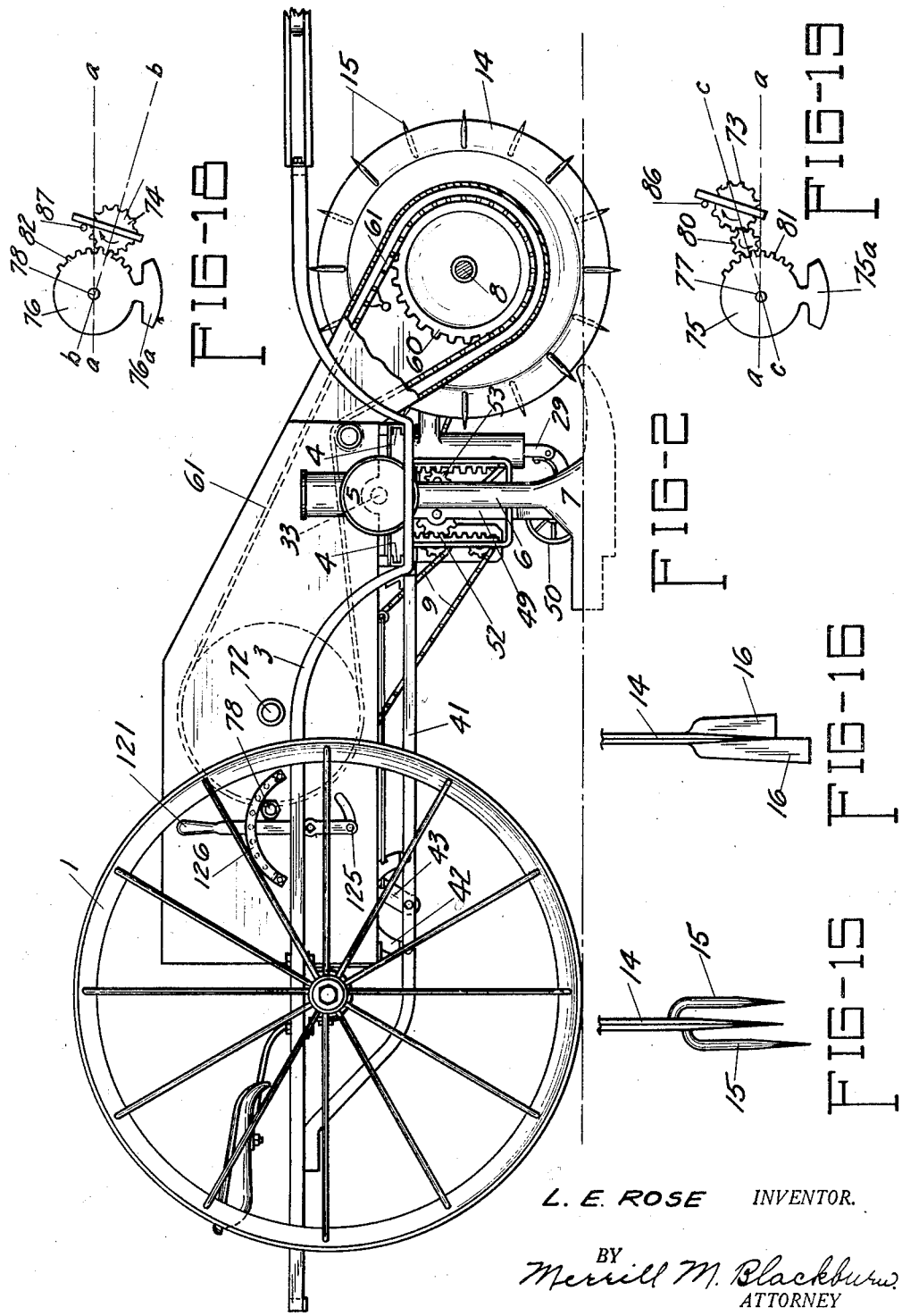
L. E. ROSE INVENTOR.
BY Merrill M. Blackburn
ATTORNEY

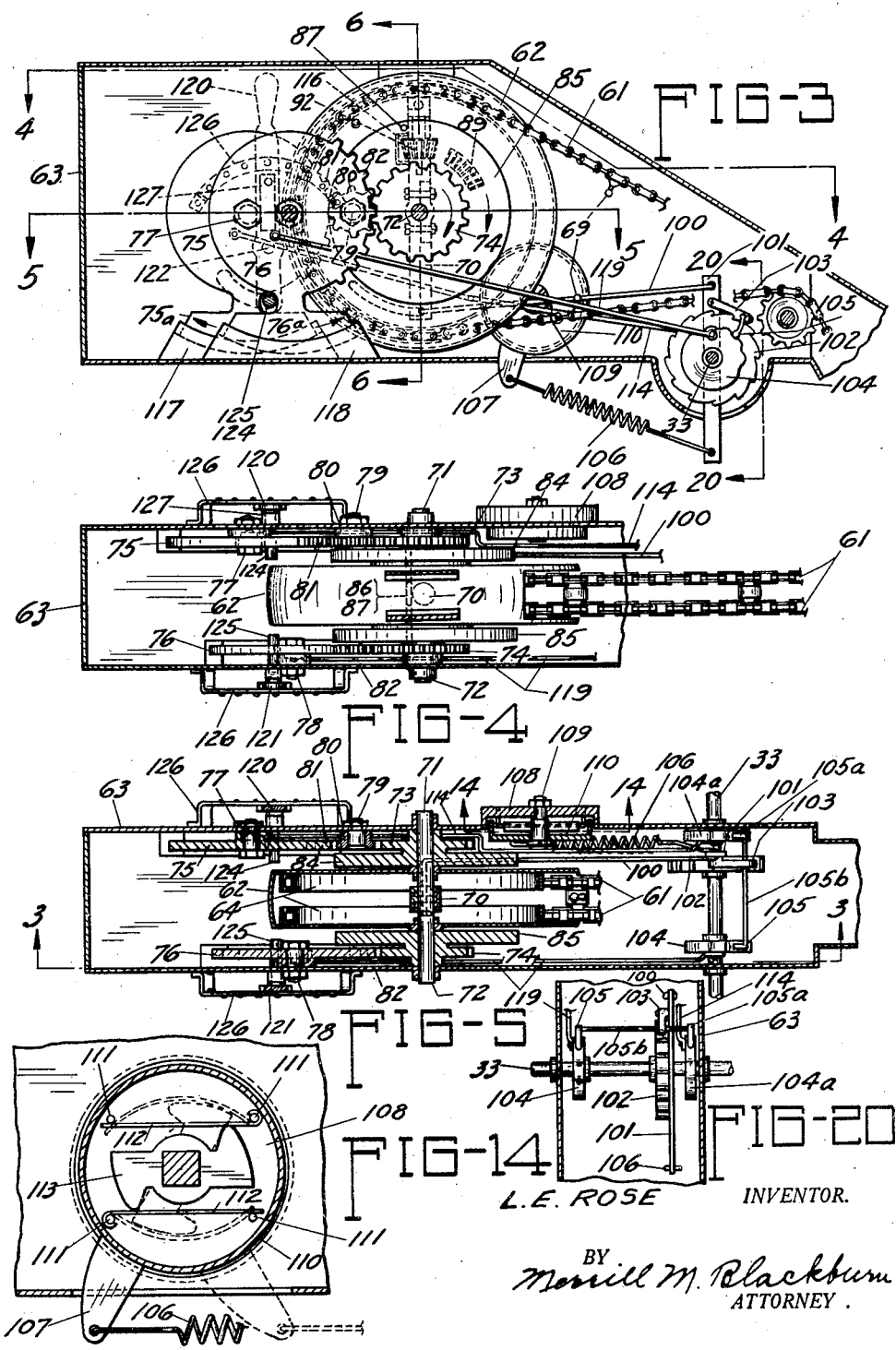

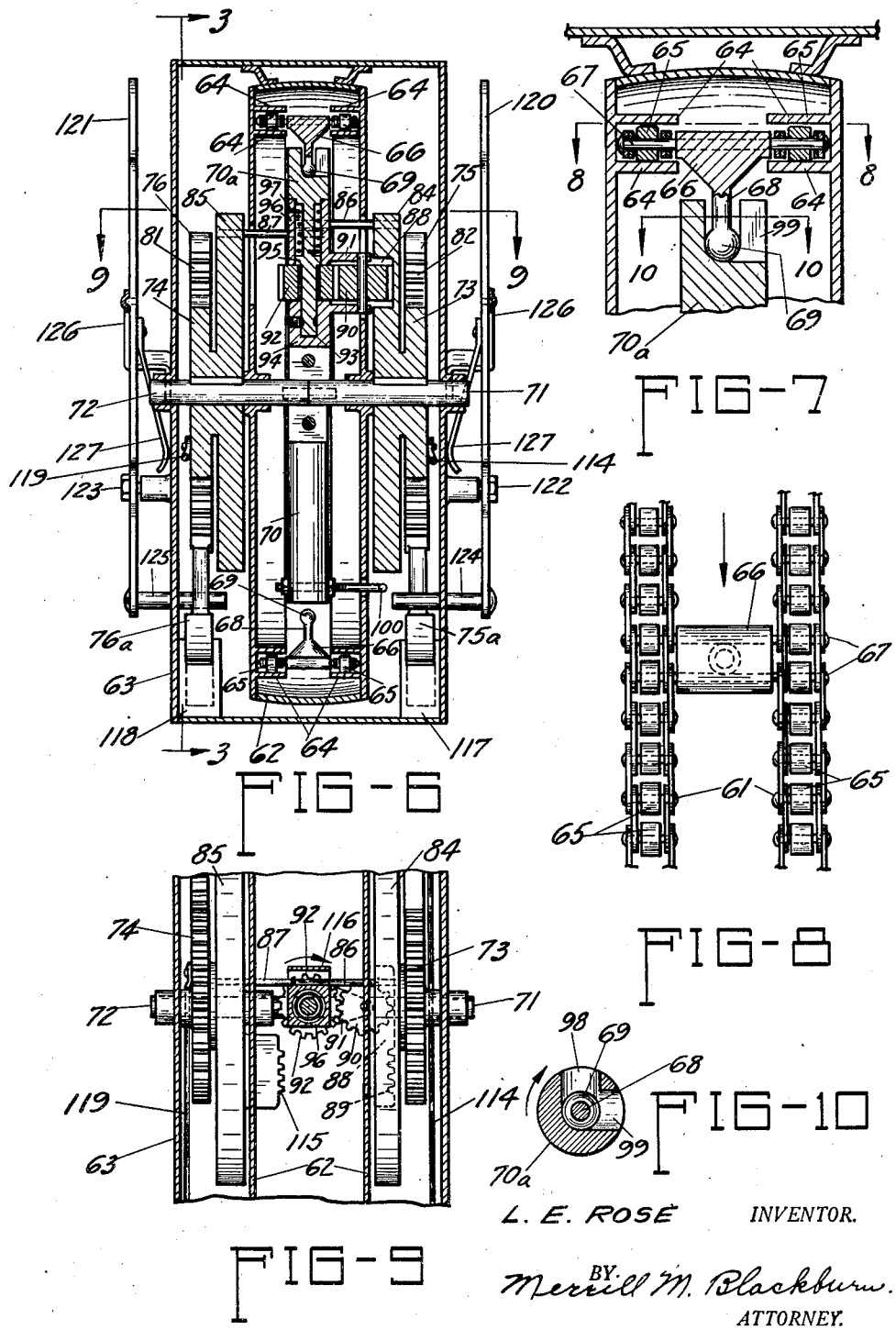

Feb. 8, 1938.  L. E. ROSE  2,107,649
CHECKROW PLANTER
Filed June 4, 1936  5 Sheets-Sheet 5
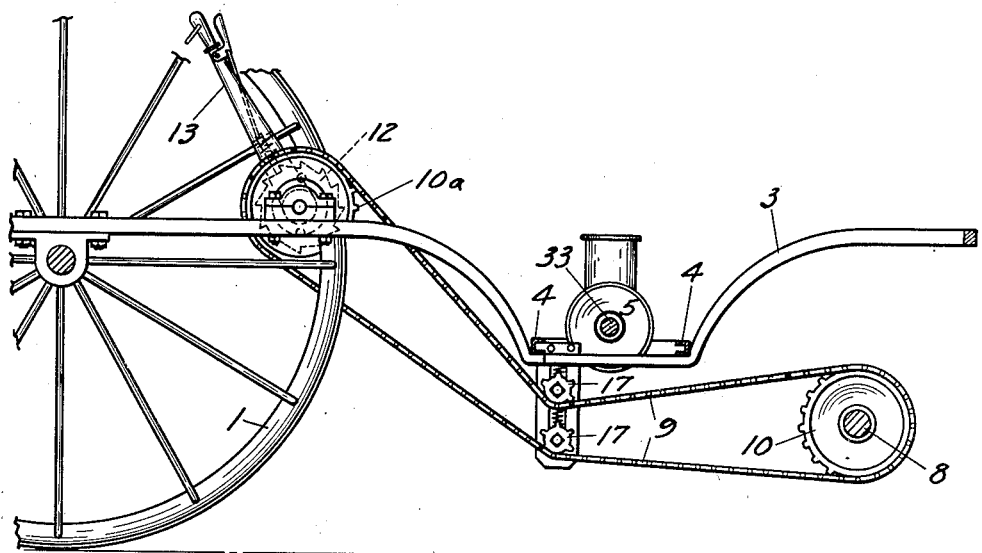
FIG-11
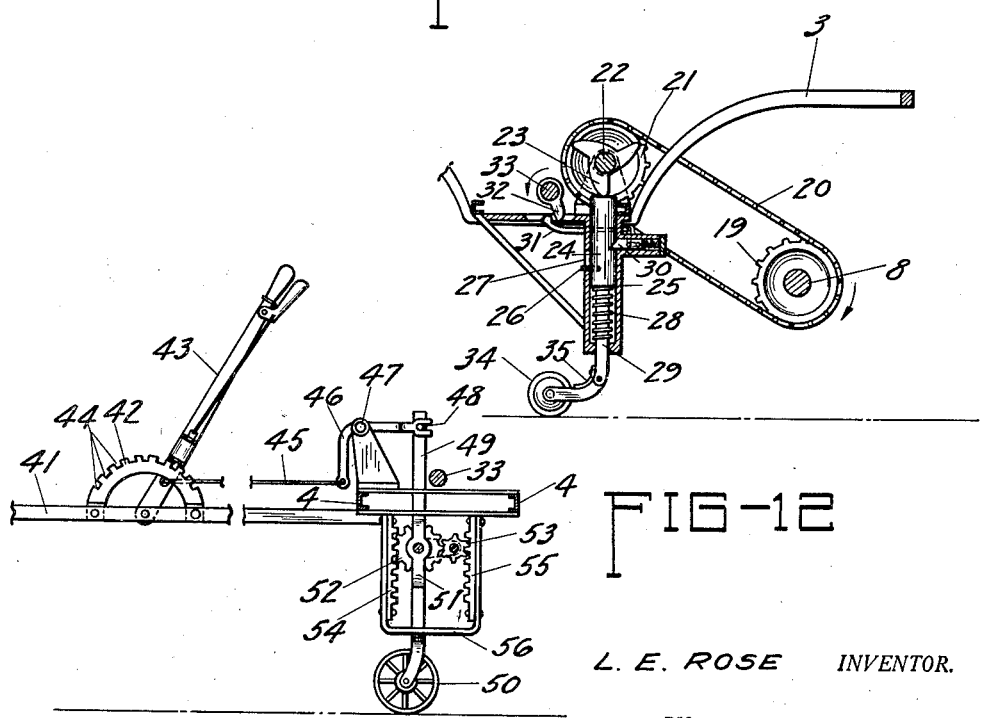
FIG-12
FIG-13
L. E. ROSE INVENTOR.
BY
Merrill M. Blackburn
ATTORNEY Patented Feb. 8, 1938

2,107,649

UNITED STATES PATENT OFFICE 2,107,649

CHECKROW PLANTER

Lynn E. Rose, Aledo, Ill., assignor of two-fifths to Gladys Felton, one-fifth to Ralph Thede, and one-fifth to D. E. Farr, all of Aledo, Ill.

Application June 4, 1936, Serial No. 83,457

8 Claims. (Cl. 111—17)

The present invention relates to planting machines and more particularly to automatic checkrow machines of the wireless type. Among the objects of this invention are to provide an improved wireless checkrow planter; to provide a wireless checkrow planter which will automatically compensate for contour irregularities of land surfaces; to provide a wireless checkrow planter having manually adjustable means for gradually compensating for sudden steep changes in land surface contours; to provide, in a machine of the character indicated, an improved ground contacting unit for furnishing the motive power for the driving of the checking mechanism; to provide, in a machine of the character indicated, improved checking mechanism; to provide an improved row location indicator; and such further objects, advantages, and capabilities as will hereafter appear and as are inherent in the construction disclosed herein. My invention further resides in the combination, construction, and arrangement of parts illustrated in the accompanying drawings and, while I have shown therein a preferred embodiment, I desire the same to be understood as illustrative only and not as limiting my invention.

In the drawings annexed hereto and forming a part hereof,

Fig. 1 represents a plan view of a machine embodying my invention, parts thereof being broken away;

Fig. 2 represents a side elevation of the structure shown in Fig. 1, with parts broken away;

Fig. 3 represents a fragmentary view, in section, the section being taken substantially along the plane indicated by the broken line 3—3, Figs. 1 and 5;

Fig. 4 represents a plan section taken substantially along the plane indicated by the line 4—4, Fig. 3;

Fig. 5 represents a horizontal section taken substantially along the plane indicated by the line 5—5, Fig. 3;

Fig. 6 represents a transverse vertical section taken substantially along the plane indicated by the line 6—6, Fig. 3;

Fig. 7 represents an enlargement of a part of the upper end of Fig. 6;

Fig. 8 represents a plan view of a section of the drive chain for the checking mechanism, as same would be shown by taking a section along the line 8—8, Fig. 7;

Fig. 9 represents a fragmentary horizontal section substantially along the plane indicated by the line 9—9, Fig. 6;

Fig. 10 represents a horizontal section taken approximately along the plane indicated by the line 10—10, Fig. 7;

Fig. 11 represents a longitudinal vertical section taken substantially along the plane indicated by the line 11—11, Fig. 1;

Fig. 12 represents a longitudinal vertical section taken substantially along the broken plane indicated by the line 12—12, Fig. 1;

Fig. 13 represents a longitudinal vertical section taken substantially along the broken plane indicated by the line 13—13, Fig. 1;

Fig. 14 represents a longitudinal vertical section taken substantially along the plane indicated by the line 14—14, Fig. 5;

Fig. 15 represents a fragmentary edge view of a dropper actuating unit, illustrated in elevation at the forward end of Fig. 2;

Fig. 16 represents a modified form of the structure shown in Fig. 15;

Fig. 17 represents a vertical longitudinal section taken substantially along the plane indicated by the line 17—17, Fig. 1;

Figs. 18 and 19 are diagrammatic views intended to illustrate movements of certain parts of the apparatus in compensating for going down hill and going up hill, respectively;

Fig. 20 represents a vertical cross section of Fig. 5 taken just inside the shoulders near the right hand end of that figure.

It is a well known fact that automatic checkrow planters, as heretofore constructed, do not satisfactorily compensate for unevenness of ground surface due to hills and valleys. Therefore, in planting upon such uneven surface, the rows have a tendency to be far from straight. My main purpose, therefore, is to provide a mechanism which will automatically compensate for such irregular land surface and will result in the rows being straight, notwithstanding the irregularities of the earth's surface.

Reference will now be made in greater detail to the annexed drawings. The main supporting wheels for the planter are indicated at 1 and the axle joining them at 2. Carried on this axle is a main frame 3 which supports a secondary frame 4 by which various parts are carried. Seed boxes 5 are carried by the main and secondary frames and have tubes 6 depending therefrom and carrying the seeds to the planter shoe 7. It will be understood that the seeds, for example, corn, when dropped, will pass downwardly through the tubes 6 and shoes 7 into the furrows formed in the ground by the shoes. This is standard practice in the art and therefore needs no further mention.

A horizontal drive shaft 8 is suspended from the main frame 3, as illustrated in Fig. 1, and supports various parts in operative relation. A sprocket chain 9 runs over a sprocket wheel 10 carried by the shaft 8. This sprocket wheel may be connected to the shaft 8 by an over-running clutch which will permit forward rotation of the shaft without driving the chain. However, I have chosen to show this over-running clutch connected with the sprocket 10a at the opposite end of the chain 9, as indicated at 11. It is really immaterial in which place this clutch is located. Connected with the sprocket at the rear end of the chain 9 is a ratchet wheel 12 which is actuated in one direction by the lever 13 to drive the shaft 8 forwardly for a purpose to be discussed later.

The drive wheel for the shaft 8 is shown in Figs. 1 and 2 at 14. This drive wheel is sharp edged and rather thin so as to cut through any clods of dirt or cornstalk roots which may be in its way. This driving wheel or disc is provided with fingers 15 or blades 16, designed to furnish sufficient resistance so that the disc will not slide through the soil but will be forced to rotate, thereby rotating the shaft 8 and the mechanisms connected therewith to be actuated thereby. A pair of spring-pressed idler pulleys 17 (see Fig. 11) are mounted to move in a substantially vertical direction and tend to take up all slack of the chain 9 and keep this chain taut at all times.

Attention is next directed to Figs. 1 and 12 in connection with the disclosure of the operation of another element of my construction, driven by the drive shaft 8. A sprocket 19 is secured to the shaft 8 and has a chain 20 passing therearound. This chain 20 also passes around the sprocket 21 connected to the shaft 22 in driving relation. A platform 4a, carried by the secondary frame 4, has supports thereon for supporting the ends of the shaft 22 on which the sprocket 21 is mounted. A cam 23 is also carried by the shaft 22 and, one or more times during each rotation of the shaft, presses down on the plunger 24. This cam is shown in Fig. 12 as having three arms and, therefore, as pressing down three times per rotation. The plunger 24 slides in a tube 25 and is held against rotation therein by the pin 26 sliding in the slot 27. A spring 28, inside of the tube 25 and surrounding the stem 29 of the plunger 24, tends to raise this plunger to its uppermost position. The spring-pressed latch 30 engages a notch in the plunger 24 when this latter is depressed by the cam 23. This latch 30 then holds the plunger 24 in depressed position until withdrawn by the lever 31 actuated by the cam 32 on the shaft 33. Since the shaft 33 is the dropper shaft which actuates the dropping mechanism causing the dropping of the seeds, it will be readily understood that every time the shaft 33 rotates once to drop seeds, it will cause release of the plunger 24. When this happens, the roller 34, pressed downwardly by the spring 35, will be raised from the ground and will cease to mark thereon. In this way, the point at which the seeds are dropped can be definitely indicated by the presence or absence of the mark caused by the roller 34. This gives a reference mark for the end of the row to enable the operator to correctly set his dropper mechanism at the beginning of the next trip across the field, resulting in the rows being substantially straight both ways of the field.

In order to adjust the dropper mechanism so that the first dropping will take place at the desired point, use is made of the mechanism illustrated in Fig. 11. As the lever 13 is pulled rearwardly, it cannot cause rotation of sprocket 10a nor of shaft 8. On the contrary, when this lever is pushed forwardly, with its ratchet in engagement with the ratchet-wheel 12, forward motion of the sprocket-wheel 10a, chain 9, sprocket-wheel 10, and shaft 8 will be caused, provided the front end of the machine is lifted so that the disc 14 is free of the ground. Backward rotation of the shaft 8 is prevented by the clutch shown in Fig. 17.

The casing 36 is rigidly secured to the casing 37 carried by the axle 2 and the secondary frame 4. Because of this rigid mounting of the casing 36, it will be impossible for it to rotate and, therefore, impossible for the disc 38, located in the casing 36 and secured to the shaft 8, to rotate backwardly because the balls or rollers 39 will be pinched between the casing 36 and disc 38, and will prevent any such reverse rotation. This type of clutch is well known and no novelty in same, per se, is claimed. From the foregoing it will be seen that the shaft 8 may rotate forwardly but never rearwardly.

Reference was made above to lifting the front end of the machine. In the description of the mechanism for accomplishing this, reference will be made more particularly to Figs. 1, 2, and 13. It will be seen in Fig. 2 that a frame bar 41 extends from the rear end of the planter to the central portion thereof and supports a sector 42 upon which is pivoted a lever 43. The sector is provided with notches 44 which are engaged by a dog carried by the lever which is, consequently, held in adjusted position thereby. From the lever, a link 45 extends forwardly and connects to one end of the bell crank lever 46, pivoted at 47. The opposite end of the bell crank is connected at 48 to the vertically moving rod 49 having a yoke at its lower end for the reception of the wheel 50. This rod 49 is provided, intermediate its ends, with a loop 51 in which is rotatably mounted a gear 52, meshing with a gear 53 and a rack 54. The gear 53 meshes with a rack 55 and serves to hold the gear 52 against separation from the rack 54. A frame 56 cooperates in holding the rod 49 in proper alignment. It will therefore be seen that as the lever 43 is pulled backwardly, the rod 49 is pushed downwardly, thus raising the middle and front portions of the frame. This lifts the shoes 7 and the disc 14 out of the ground, and the machine is then ready for turning around at the ends of the field.

A pair of sprocket wheels 60 are secured to the shaft 8 inside of the forward end of the casing 37 and therefore rotate as the shaft 8 rotates. Upon these sprocket wheels are mounted a pair of chains 61 which pass through the forward side of the casing 62, located inside the enlargement 63 of the casing 37. Inside of the casing 62 are located tracks 64 upon which the rollers 65 of the chains 61 roll and by which the rear loops of these chains are supported in the casing. Blocks 66 are supported between the chains 61 by long rivets or pins 67 which extend through both chains and the blocks. Each block 66 has a stem 68 projecting inwardly therefrom, each stem being provided upon its inner end with a ball head 69.

A tripper bar 70 is pivotally mounted inside of the casing 62 on a composite shaft made up of the sections 71 and 72. These sections 71 and 72 are pivotally connected by a pin shown in the middle of Fig. 6 so that they may turn independently on the same axis. Upon these shaft sections 71 and 72 are keyed gears 73 and 74, and these therefore partake of the motions of the shaft sections. It will be noted that the shaft sections are pivotally supported by the casings 62 and 63, the former of which is suspended from the top of the latter, as shown clearly in Fig. 6.

A pair of pendulum members 75 and 76 are mounted, respectively, upon the pivot pins 77 and 78, supported by the lateral walls of the section 63 of casing 37. A pivot pin 79, also mounted in a wall of the section 63, carries a pinion 80 which meshes with the gear 73 and the curved rack 81 formed on the edge of member 75. The gear 74 meshes directly with the curved rack 82, as shown most clearly in Fig. 3.

Discs 84 and 85 are integral with or rigidly secured to gears 73 and 74 and therefore move with them. These discs carry pins 86 and 87 which reach in and overlap, as shown in Figs. 6 and 9. The purpose of these pins is to automatically adjust the position of the tripper rod 70 as the machine travels up or down hill. The operation of these parts will be explained presently.

In the inner face of the disc 84 is formed a pocket 88 having a rack 89 adapted to be engaged by a gear 90 pivotally mounted on a pin carried by a pair of brackets 91. A gear 92 meshes with the gear 90 and is carried by a spindle 93, preferably circular in cross section, since the lower end of this spindle 93 must be able to rotate in the socket formed in part 94 of the dropper bar 70. The part of spindle 93 to which the gear 92 is connected may be either circular or angular in cross section. However, there must be driving connection between this gear and spindle and, therefore, if the spindle is circular, then the gear must be secured thereto by a set screw or otherwise, to have driving relation therewith.

An enlargement 95 is formed on the spindle 93 to hold the sleeve 96 and the spindle in coaxial relationship. A cylindrical cavity between the sleeve 96 and the spindle is occupied by a spring 97 which has one end connected to the spindle and the other end to the sleeve. This spring holds the head of the tripper rod 70 in proper position for engagement by the ball 69, indirectly carried and actuated by the chains 61. The balls or heads 69, as the chains move forwardly, enter the opening 98 in the upper end of the tripper rod 70 and engage the wall at the inner end of this opening 98. As the chains travel forwardly, the rod 70 is rocked on the shaft sections 71 and 72, thus causing actuation of the link 100, connected to the lever 101. This lever 101 is connected to the ratchet 102 by the pawl 103, intermittently actuated by the lever 101. This ratchet is rigidly connected to the dropper shaft 33 and therefore causes intermittent rotary motion thereof to cause dropping of the grain.

A disc 104, provided with a scalloped edge, is loosely mounted on the shaft 33 and its edge is engaged by a finger 105 carried by a shaft 105b connected to the pawl 103, as shown in Figs. 3 and 5. A similar disc 104a, on the opposite side of ratchet 102, is engaged by a finger 105a on shaft 105b and operates in the same manner as disc 104. The disc 104a is connected to the weighted disc 75, by a link 114, and is therefore caused to move simultaneously with the disc 75, under the influence of the weight 75a, but in the opposite direction. A similar link 119 connects the weighted disc 76 with the disc 104 and causes rotation of these two in opposite directions when the disc 76 is swung forwardly by the weight 76a, when going down hill. The purpose of the discs 104 and 104a and the finger 105 is to lift the pawl 103 out of the notches in the ratchet 102, thus preventing dropping of the seed improperly when the ratchet 102 is improperly positioned by virtue of the machine having gone up or down hill and then having come to level ground.

A spring 106 has one end connected to the lever 101 and its opposite end connected to the arm 107, as shown most clearly in Figs. 3 and 14. The arm 107 extends downwardly through the bottom of the casing 63 where it may have the end of spring 106 connected thereto. A hollow boss 108 is formed on one side of the casing 63 and has a pivot pin 109 extending therethrough and secured thereto. This pin has a drum 110 secured thereto inside of the casing 63 and extending into the hollow of the boss 108. Projecting inwardly from the inner face of this boss are pins 111, to two of which are secured springs 112, the free ends of which rest against other pins. A cam arm 113 engages these springs and, when turned between them, flexes them outwardly, as shown by the dotted lines in Fig. 14. This occurs when the lever or arm 107 is pulled toward the dotted line position shown in Fig. 14. The purpose of these springs 112 is to return the arm 113 to the position shown in this figure when the lever 101 returns to the position shown in Fig. 3. Instead of parts 106 to 113, inclusive, a spring may be connected to the lower end of the lever 101, said spring being made long enough to reach to an eye near the rear end of the bottom of casing 63. In this way, all of the desired movement of the lever 101 may be had without substantial increase of the tension on the return spring which is substituted for spring 106. This will do away with the necessity for casing 108 and the parts therein.

As the chains 61 carry the balls 69 into engagement with the tripper bar or dropper bar 70, this bar is rocked forwardly which pulls the link 100 rearwardly, rocking lever 101 about the shaft 33, as described above. This carries the lower end of lever 101 forwardly, placing a tension upon spring 106. When this tension upon spring 106 reaches a certain predetermined amount, it causes rotation of the cam arm 113 and flexure of the spring 112. Then, when the ball 69 is released from the tripper bar 70, this latter is returned to the upright position shown in Fig. 3 by the tension of the springs 106 and 112.

A rack 115, projecting inwardly from the inner face of disc 85 and through an opening in a lateral wall of casing 62, cooperates with gear 92 in the rotation of the head of tripper bar 70 so that this bar will be released when the seed is dropped and will again return to its normal vertical position ready for its next actuation. The rotary actuation of this head will next be described. As the bar 70 swings about the shaft sections 71 and 72, under the pressure of head 69, either gear 90 is carried into engagement with rack 89 or gear 92 into engagement with rack 115. Rotation of either gear by its corresponding rack will cause rotation of head 70a through an arc and, when this rotation is ninety degrees (90°), the ball 69, which has entered opening 98, will pass out through opening 99, thus releasing bar 70 to return to normal position. As it goes backwardly, gear 92, as well as spring 97, tends to cause head 70a to assume the normal position shown in Figs. 6, 7, 9, and 10. A bridge 116 connects the sleeve 96 with the body of bar 70 so that the two are relatively immovable. In this respect, bridge 116 cooperates, in part, with brackets 91.

Guides 117 and 118 are provided in the bottom part of the casing 63 for the weights 75a and 76a to guide the same in their swinging on pins 77 and 78. In Figs. 18 and 19, the lines a—a represent a horizontal plane while the line b—b, in Fig. 18, represents the inclination of the ground when the planter is travelling down hill, and c—c represents the corresponding inclination of the ground when the planter is travelling up hill. These diagrams represent the relative positions of these parts when travelling on ground inclined as indicated.

When weight 76a swings forwardly, it causes the top of gear 74 and of disc 85 to turn forwardly, carrying pin 87 into engagement with sleeve 96, thus swinging the top of dropper bar 70 forwardly so that engagement of ball 69 with head 70a will be delayed. Rotating the disc 85 forwardly carries rack 115 forwardly so that engagement of gear 92 therewith will be delayed, thus delaying release of ball 69 through opening 99. This delay in the dropping of the seed causes wider separation of the rows which is necessary to compensate for the greater distance which the planter has to travel in going up or down hill.

What has ben described above concerning weight 76a, when going down hill, is true also in connection with weight 75a, when going up hill. Because of the intermediate gear 80, the swinging of the weight 75a rearwardly is compensated for and causes forward swinging of the dropper bar 70, just as in the case previously described. In this case, it is the pin 86 which pushes the bar 70 forwardly, instead of the pin 87, but in both cases the effect is to widen the distance between the rows on the slope, whether going up hill or down.

Sometimes the ground has excessive slopes which it is practically impossible to compensate for in a short distance and it is desirable to spread the excess distance, in part, over the level part of the field, instead of trying to take care of it all on the sloping part. For this purpose, there are provided the levers 120 and 121, pivoted at 122 and 123. These levers carry, at their lower ends, the pins 124 and 125 which project through the side walls of the casing 63. As shown in Fig. 3, the pin 125 is located rearwardly of the supporting shank for weight 76a, while pin 124 is located forwardly of the shank of weight 75a, thus preventing oscillation of the weights in the wrong direction. If the lever 120 is pushed forwardly, disc 75 and gear 74 are rotated forwardly and pin 86 moves forwardly, forcing the top of dropper bar 70 forwardly and retarding the dropping of the seed. This has the effect of spreading the rows on the level or slightly sloping ground so as to take up part of the excess distance which will be introduced by the sharply sloping ground. The rest can then be compensated for, automatically, in the normal manner. The same result can be accomplished by pulling the lever 121 rearwardly, this process being used when the slope to be compensated for is a steep downward one. Pushing lever 120 forwardly swings weight 75a backwardly. Similarly, pulling lever 121 rearwardly swings weight 76a forwardly. These movements result in corresponding travel of gears 73 and 74.

Arcuate bands 126 are secured to opposite sides of the casing 63 and are provided with depressions which may be engaged by corresponding projections on the levers 120 and 121. These depressions and projections cooperate to hold the levers in adjusted positions. Leaf springs are carried by the levers which bear against the sides of the casing in order to hold the levers out in tight engagement with the bands so that they will be held in adjusted position. When the levers 120 and 121 are set in normal vertical position, the pin 124 prevents the weight 75a from swinging forwardly, moving the top of disc 84 backwardly and shortening the spacing between the rows of seeds, while the pin 125 prevents weight 76a from swinging backwardly and shortening the spacing between the rows.

As the dropper bar 70 is oscillated forward and backward by the chain 61 and the springs 106 and 112, the lever 101 is oscillated about the shaft 33, turning ratchet 102 one step forwardly and moving shaft 33 correspondingly to cause actuation of the dropper mechanism located in the seed boxes 5.

It is of course understood that the specific description of structure set forth above may be departed from without departing from the spirit of this invention as set forth in this specification and the appended claims.

Having now described my invention, I claim:

1. In a planter having supporting wheels and frame, lifting means for the front portion of the frame, manual means for actuating said lifting means, a drive shaft supported by the forward end portion of the frame, an edged, cutting disc carried by said shaft in driving relation, said disc having ground-gripping projections to compel rotation of said disc and shaft, intermittently actuated seed-dropper mechanism, including a rotary shaft, an intermittently functioning connection between said shafts, to cause intermittent rotary motion of the second mentioned shaft, manually operated shaft-operating means whereby the first named shaft may be rotated forwardly when the disc is lifted out of engagement with the ground, and a loose connection between said first mentioned shaft and said manually operated means whereby to permit rotation of said first mentioned shaft without movement of said manually operated means.

2. In an automatic planter having supporting wheels and framework, an intermittently functioning dropper shaft, a drive shaft, and ground-engaging means on said drive shaft to cause rotation thereof when said ground-engaging means is in engagement with the ground, the combination of a ratchet mechanism for causing the intermittent motion of the dropper shaft, oscillating means for actuating the ratchet mechanism, connections between the drive shaft and the oscillating means to cause oscillating movement of the oscillating means, and gravity actuated means for varying the point at which the oscillating means actuates the dropper shaft to cause dropping of the seed.

3. In an automatic planter having supporting wheels and framework, an intermittently functioning dropper shaft, a drive shaft, and ground-engaging means on said drive shaft to cause rotation thereof when said ground-engaging means is in engagement with the ground, the combination of a ratchet mechanism for causing the intermittent motion of the dropper shaft, oscillating means for actuating the ratchet mechanism, connections between the drive shaft and the oscillating means to cause oscillating movement of the oscillating means, and gravity actuated means for varying the point at which the oscillating means actuates the dropper shaft to cause dropping of the seed, and having, also, manual means for partly or wholly overcoming the control of the gravity actuated means.

4. In an automatic checkrow planter having a supporting framework, the combination of a driving shaft, a driving unit for said shaft engaging the soil and causing rotation of said shaft, a dropper-shaft for causing the machine to intermittently drop seeds, sprockets carried by the first mentioned shaft, guiding means carried by the framework, sprocket chains travelling over said sprockets and guiding means and guided thereby, said chains being driven by the first mentioned shaft, a dropper-bar connected to said dropper-shaft for intermittent operation thereof, blocks connecting the sprocket chains and actuated thereby past the dropper-bar, connections between the dropper-bar and the dropper-shaft, and projections from the blocks to engage the dropper-bar and cause oscillation thereof to cause intermittent forward rotary motion of the dropper-shaft.

5. A checkrow planter having automatic correction for ground surface inclination, comprising dropper mechanism for intermittent dropping of seeds, a dropper shaft for actuating said mechanism, a dropper-bar and connections therefrom to the dropper-shaft for the transmission of impulses from the bar to the shaft, weighted means for automatically adjusting the position of the bar in accordance with the slope of the ground surface, and manual means for adjusting the weighted means to cause application of part of the correction for excessive slopes to ground having little or no slope.

6. In an automatic checkrow planter, seed-dropping mechanism, including, as an element thereof, a ratchet-operated shaft, ground-actuated means for actuating the shaft intermittently to cause dropping of the seeds, and timing mechanism for advancing or retarding the functioning of the seed-dropping mechanism, said timing mechanism being both gravity actuable and manually actuable to modify operation of the dropping mechanism, the manual actuation being utilized to vary the effect of the gravity actuation.

7. In a checkrow planter having seed-containing boxes and a shaft to cause dropping of seeds therefrom, a driven shaft, means operatively connecting it to the first mentioned shaft to cause intermittent rotation thereof, a third shaft connected to the driven shaft to rotate synchronously therewith, a marking implement below the third shaft and depending into contact with the ground, said marking implement being reciprocable into and out of contact with the ground, a cam on the third shaft engaging the marking implement to cause reciprocation thereof into marking position, a spring for raising the marking implement out of contact with the ground when released by the cam for upward movement, and holding means to retain the marking implement in marking position, the first mentioned shaft being provided with a cam to cause the marking implement to be released so that it may rise to non-marking position.

8. In an automatic planter having supporting wheels and framework, an intermittently functioning dropper shaft, a drive shaft, and ground-engaging means on said drive shaft to cause rotation thereof when said ground-engaging means is in engagement with the ground; the combination of a ratchet mechanism for causing the intermittent motion of the dropper shaft, oscillating means for actuating the ratchet mechanism, connections between the drive shaft and the oscillating means to cause oscillating movement of the oscillating means, a cam on the dropper shaft to lift the pawl of the ratchet mechanism out of engagement with the notched member thereof, and a finger carried by the pawl and engaging the cam to assist in lifting the pawl.

LYNN E. ROSE.